(12) United States Patent
Jansen et al.

(10) Patent No.: US 9,531,936 B2
(45) Date of Patent: Dec. 27, 2016

(54) CAMERA SYSTEM, COLOUR MEASURING SYSTEM, AND OFFSET PRINTING PRESS

(71) Applicant: Q.I. Press Controls Holding B.V., Oosterhout (NL)

(72) Inventors: Menno Jansen, Oosterhout (NL); Erik Andreas van Holten, Oosterhout (NL)

(73) Assignee: Q.I. Press Controls Holding B.V., Oosterhout (NL)

(*) Notice: Subject to any disclaimer, the term of this patent is extended or adjusted under 35 U.S.C. 154(b) by 0 days.

(21) Appl. No.: 14/441,792

(22) PCT Filed: Nov. 8, 2013

(86) PCT No.: PCT/NL2013/050798
§ 371 (c)(1),
(2) Date: May 8, 2015

(87) PCT Pub. No.: WO2014/073962
PCT Pub. Date: May 15, 2014

(65) Prior Publication Data
US 2015/0304542 A1    Oct. 22, 2015

(30) Foreign Application Priority Data
Nov. 9, 2012 (NL) ..................................... 2009786

(51) Int. Cl.
*H04N 5/232* (2006.01)
*B41F 33/00* (2006.01)
(Continued)

(52) U.S. Cl.
CPC ......... *H04N 5/23212* (2013.01); *B41F 13/025* (2013.01); *B41F 33/00* (2013.01); *B41F 33/0036* (2013.01); *B41F 33/0045* (2013.01); *G06T 7/001* (2013.01); *G06T 7/0081* (2013.01); *G06T 7/0097* (2013.01); *H04N 1/6044* (2013.01); *H04N 5/2252* (2013.01); *H04N 5/2256* (2013.01); *H04N 5/2258* (2013.01);
(Continued)

(58) Field of Classification Search
None
See application file for complete search history.

(56) References Cited

U.S. PATENT DOCUMENTS

| 5,774,635 A | 6/1998 | Kuusisto et al. |
| 2004/0177783 A1* | 9/2004 | Seymour ............. B41F 33/0045 101/484 |

(Continued)

FOREIGN PATENT DOCUMENTS

| DE | 19538811 A1 | 11/1996 |
| EP | 1353493 A1 | 10/2003 |

(Continued)

*Primary Examiner* — Christopher D Wait
(74) *Attorney, Agent, or Firm* — Bret E. Field; Rudy J. Ng; Bozicevic, Field & Francis LLP

(57) ABSTRACT

The present invention relates to a camera system (1). The invention also relates to a color measuring system and a printing press provided with such a color measuring system and/or camera system. The focal distance can be determined by making use of a plurality of sensors (2, 2', 2", 2'", 15) to record an image of the printed image (8, 16, 17) printed by the press and determining the overlap (9, 9', Ov) between these images (16, 17).

13 Claims, 4 Drawing Sheets

(51) Int. Cl.
  *B41F 13/02* (2006.01)
  *H04N 5/225* (2006.01)
  *H04N 1/60* (2006.01)
  *G06T 7/00* (2006.01)
  *H04N 5/247* (2006.01)

(52) U.S. Cl.
  CPC .......... *H04N 5/23229* (2013.01); *H04N 5/247* (2013.01); *G06T 2207/10004* (2013.01); *G06T 2207/10024* (2013.01); *G06T 2207/10148* (2013.01); *G06T 2207/30144* (2013.01); *G06T 2207/30168* (2013.01)

(56) References Cited

U.S. PATENT DOCUMENTS

| | | | |
|---|---|---|---|
| 2008/0273758 A1* | 11/2008 | Fuchs | F16P 3/14 382/106 |
| 2009/0009831 A1* | 1/2009 | Pollard | G06T 3/4015 358/505 |
| 2011/0013202 A1* | 1/2011 | Muramatsu | G03G 15/5062 358/1.2 |
| 2013/0113857 A1* | 5/2013 | Armbruster | B41J 29/38 347/16 |
| 2013/0335599 A1* | 12/2013 | Zhang | H04N 5/225 348/239 |

FOREIGN PATENT DOCUMENTS

| | | | |
|---|---|---|---|
| EP | 1445099 A1 | 8/2004 | |
| EP | 1457335 A1 | 9/2004 | |
| EP | 1625937 A1 | 2/2006 | |
| EP | 2394745 A1 | 12/2011 | |
| JP | H08 062488 A * | 3/1996 | |
| JP | 2394745 A1 * | 12/2011 | .......... B41J 2/04508 |
| WO | WO2005087494 A1 | 9/2005 | |

* cited by examiner

CAMERA SYSTEM, COLOUR MEASURING SYSTEM, AND OFFSET PRINTING PRESS

The present invention relates to a camera system. The application further relates to a colour measuring system and a printing press provided with such a colour measuring system and/or camera system.

A camera system as defined by the preamble of claim 1 is known from EP 1 457 335 A1.

The following definitions are used in the context of the present invention.

A printing press is a press for printing graphic information, such as text or figures, on a substrate. The printing press is particularly an offset printing press, such as a rotary offset printing press. The printing press is generally provided with measuring systems for measuring the printed information. The substrate can take the form here of a paper web which is stabilized at the position of the measuring systems by means of rollers. It is however also possible for the paper web not to be stabilized, whereby it can move in the height. This latter paper web is referred to in the present invention as a free-running paper web.

A digital print image is a digital file having information therein relating to the image for printing.

A printed image is the image printed on the substrate by the printing press.

The focal distance is the distance between the printed image and a preferably fixedly disposed optical camera. The focal distance preferably corresponds to the distance between the printed image and an entrance pupil of the optical camera.

In the graphic industry, particularly during production of printed material on rotary offset printing presses, different optical cameras are used to measure quality of the produced printed material. Use is generally made of different cameras for different functions, such as measuring the colour register, measuring the colour in the printed material or of a colour bar and measuring defects in the printed material. Solutions are also known here wherein multiple functions are realized with one camera.

A demand has arisen in the graphic industry for a solution wherein all quality-related matters can be measured using the fewest possible cameras. This is because this is more cost-efficient, saves space and reduces the costs and effort associated with the cleaning and servicing of the cameras.

Use is further made of camera systems which make a recording of a free-running, non-stabilized paper web as well as of a non-free-running, stabilized paper web. Since the focal distance is fixed in the case of a stabilized web, focus-related corrections need not be performed per recording. In the case of a non-stabilized web the focal distance is determined and focus-related corrections are performed per recording. Determining of the focal distance is normally performed by identifying locating points in the printed image, after which the focal distance is determined on the basis of the changes in the position of these locating points in the recording relative to the position of these locating points in the case of a recording made with exact focus. The light intensity and the positioning of the printed image are corrected on the basis of the changes in the focal distance so that the outcome is the same as in a recording of a stabilized web. The processing of locating points in a recorded image in order to determine the focus is for instance described in U.S. Pat. No. 5,774,635.

When measuring a free-running web the use of the number of locating points to compensate for focus variations per recording is limited by the dependence on the printed image. Two to five locating points are normally used per recording so that the recording can be positioned in x and y direction, the recording can be scaled in x and y direction and variations in light intensity can be compensated. If however greater variations such as waves or folds in the paper web occur at shorter distances, this is not identified and may be wrongly corrected.

EP 1 353 493 A1 describes the problem of precisely defining the part of interest in an image and reproducibly scanning this part on a moving paper web. The printed image is shown for this purpose in combination with a pressure-sensitive screen. This can be employed by a user to indicate measuring positions of interest which are then stored in a memory. Measurements can later be performed at the measuring positions during printing for the purpose of monitoring the printed material.

The mechanical and electrical enlargement of a specific area in the printed material with a camera is often necessary for the purpose of enlarging the image for the operator of the printing press. Known from EP 1 353 493 is a method for identifying the enlarged part relative to a reference. This method is however based on the image information. This method is less suitable in the case of a greatly and rapidly varying focal distance, as in the case of a free-running paper web.

DE 195 38 811 A1 describes a method using hardware and software for compensating undesired light effects influencing an accurate measurement of colour in the printed material. DE 195 38 811 A1 states that, in addition to the compensation required for sensor, lens and lighting effects, compensation is necessary in the case of a varying focal distance. DE 195 38 811 A1 proposes for this purpose the use of paper web stabilizers. In the case of a free-running paper web, wherein the focal distance varies rapidly and greatly, there is a great increase in the inaccuracy of the above corrections.

The object of the present invention is to provide a solution to the above problem.

This object is achieved according to the invention with a camera system as defined in claim 1 for a printing press, such as an offset printing press, which printing press is configured to print a printed image on a substrate. This system comprises a pair of sensor units, the pair comprising a first and second optical sensor unit, each configured to record a respective image of the substrate or printed image. An angle of view of the first optical sensor unit overlaps here an angle of view of the second optical sensor unit in an overlap area and the substrate or printed image is situated at least partially in said overlap area. The overlap area is here a part of the space in which objects can be seen by both the first and the second optical sensor unit.

The camera system further comprises a processing unit operatively coupled to said first and second optical sensor units. According to the invention the processing unit is configured to determine a focal distance from at least one of the first and second sensor units to the substrate or printed image using an overlap of the respective images.

The above system provides the advantage during measuring of a free-running paper web that correction can be made for the focal distance with the accurately measured focal distance. With this technique the waves and folds in the paper web can be identified and measured. The waves in the paper also provide a value for the web tension and the quality of the paper, and this can be used to assess and optionally correct the printing process. The variation in the height difference in the wave combined with the distance between the waves thus provides a value for the stability in the web tension. The information relating to the waves in the paper also indicates where and how much the lighting has to be corrected locally so that colours can be measured accurately.

For the purpose of determining said focal distance use can be made of a substrate, optionally unprinted, or a substrate on which a printed image is printed. Even in unprinted state the substrate, generally a paper web, usually comprises sufficient irregularities which can be seen by the sensor units and which can be used to determine the focal distance.

Owing to the local compensation of the focal distance in a recording as a result of the overlap of two images, image recordings can be made of a large surface area of the paper web. In an image recording which is twice as high and twice as wide this results in a fourfold acceleration in the processing of information. The printing process can hereby be controlled more quickly and precisely.

An advantage is that the fouling in the optical path between the printed image and the sensor unit can be determined by means of overlapping images. The changes in the image relative to a calibrated image make it possible to determine where the fouling occurs. If for instance a first sensor unit sees fouling, this means that the optical path associated only with the first sensor unit is fouled. If both the first and second sensor unit see fouling, this means that the optical path associated with both sensors, such as a sheet in front of the camera, is fouled.

Each of said first and second optical sensor units preferably comprises a sensor and a lens for the purpose of focussing light on said sensor. Said sensor can comprise here a Charge-Coupled Device (CCD) chip or similar technology.

The camera system preferably further comprises one lighting source disposed for both the first and second optical sensor units for the purpose of illuminating the substrate or printed image prior to recording of the respective image of the substrate or printed image. Use is usually made of light sources which generate short pulses with very high light intensity such that a short shutter time can be used. The shutter time is preferably as short as possible in respect of the high speed of for instance the paper web.

The combination of one lighting source with a plurality of sensors provides the advantage that measured differences in colour between the two sensors cannot have been caused by the lighting source. An automatic calibration of the sensors can hereby be performed with greater accuracy. By automatically calibrating out the differences in colour between the two sensors the differences in colour measured using the two sensors are minimal.

A resolution and/or dynamic range of the first sensor unit can differ from a resolution and/or dynamic range of the second sensor unit. A substantially higher dynamic range can hereby be realized in the overlap area. The first sensor unit can thus measure the colours from white to black with the available range, while the second sensor unit is set so that it can measure the colours from black to light black with the same range. This increase in the dynamic range provides the possibility of much better measurement of colours and accurate measurement of higher density values.

At least one colour filter can be placed for at least one of the first and second sensor units. Placing a colour filter for one of the two sensors results in an enhanced measurement of the colours. The extra colour channels created by the placed filter provide extra colour information relating to the colours in the printed image which is measured simultaneously by two sensors. The colours can hereby be better measured and a camera system having six colour measuring channels can for instance be realized.

The camera system can further comprise a housing in which at least the first and second sensor units and the one lighting source are accommodated. The use of a single housing provides the advantage that a more compact unit can be obtained. Maintenance, such as cleaning, is also easy to realize.

The housing can be provided with at least one sensor opening for passage of light coming from the substrate or printed image in the direction of the first and/or second optical sensor unit and with at least one illumination opening for passage of light coming from the one lighting source in the direction of the substrate or printed image. It is recommended here to use one opening per optical sensor unit.

Each of said first and second optical sensor units preferably has an entrance pupil, wherein the entrance pupils are placed at a predetermined distance from each other, wherein said focal distance is measured from the entrance pupil of at least one of the first and second optical sensor units to the substrate or printed image.

Each of the first and second optical sensor units can have an optical axis, wherein said optical axes run substantially parallel and each optical axis intersects the relevant entrance pupil, wherein the focal distance is measured along at least one of the optical axes.

It is recommended for the optical sensors to be placed parallel to and at a distance from each other, each directed toward the substrate or printed image for detecting.

The processing unit is preferably configured to determine the focal distance using the predetermined distance, the angle of view of at least one of the first and second optical sensor units and the overlap of the respective images.

The processing unit is preferably configured to determine the overlap between the respective images using convolution calculations of the respective images.

The camera system can comprise a plurality of said pairs of sensor units, wherein the processing unit is operatively coupled to each optical sensor unit and is configured to determine for each pair a focal distance from at least one of the first and second sensor units of this pair to the substrate or printed image using an overlap of the respective images, wherein the overlap in recorded images associated with a pair of sensor units abuts or overlaps an overlap in recorded images associated with an adjacent pair of sensor units.

According to another aspect, the invention provides a colour measuring system for measuring colour in a printed image printed by a printing press. This system comprises the above stated camera system for determining a focal distance from at least one of the first and second optical sensor units of the camera system to the printed image and for recording a respective image of the printed image using the first and second optical sensor units. The colour measuring system also comprises a colour correcting unit for performing a colour correction on at least one of the respective images subject to the determined focal distance.

Because the printed image does not lie at a constant distance from the first and/or second sensor unit in the case of a free-running web, the detected light intensity and/or colour of two identical printed images can differ in accordance with the focal distance. Normally speaking the detected light intensity will thus decrease quadratically with the distance. It is therefore recommended that the colour correction unit corrects a light intensity detected by the first and/or second sensor unit using the determined focal distance.

According to a further aspect, the invention provides a printing press comprising the above described colour correction unit and/or the above described camera system.

This printing press preferably further comprises a memory for storing a digital print image, wherein the digital print image comprises a feature. The printing press preferably also comprises a scaling unit for scaling an image recorded by the first and/or second sensor unit of a printed image corresponding to the digital print image printed on a paper web by the printing press using the distance determined with the camera system and the digital print image.

When the distance between the paper web and the sensor units is constant, the size of a recorded image, or the enlargement, is determined by the optical system. A better correlation between the recorded image and the digital print image forming the basis thereof can be made by correcting for a varying distance between paper web and sensor units. This makes it possible to precisely determine a position of a feature in the printed image. The printing press can for this purpose further comprise a position determining unit for determining a position of the feature in the scaled image. The printing process can then be controlled using this position. The printing press can thus be provided with a position control unit for controlling a position of the paper web subject to the determined position of the feature. An example hereof is the position of the feature relative to an edge of the paper web.

The printing press can be a digital printing press provided with a plurality of individual nozzles for applying ink to the paper web. The printing press can here further comprise a nozzle fouling unit configured to detect a deviation in the printed image running in longitudinal direction of the paper web. The position determining unit is configured here to determine the position of the running deviation and the nozzle fouling unit identifies a nozzle responsible for said running deviation based on the position of said running deviation.

The present invention will be discussed in more detail hereinbelow with reference to the accompanying figures, in which:

FIG. 1 shows an embodiment of a camera system 1 according to the present invention. FIG. 2 shows here the internal structure of this camera system.

Figure 1:
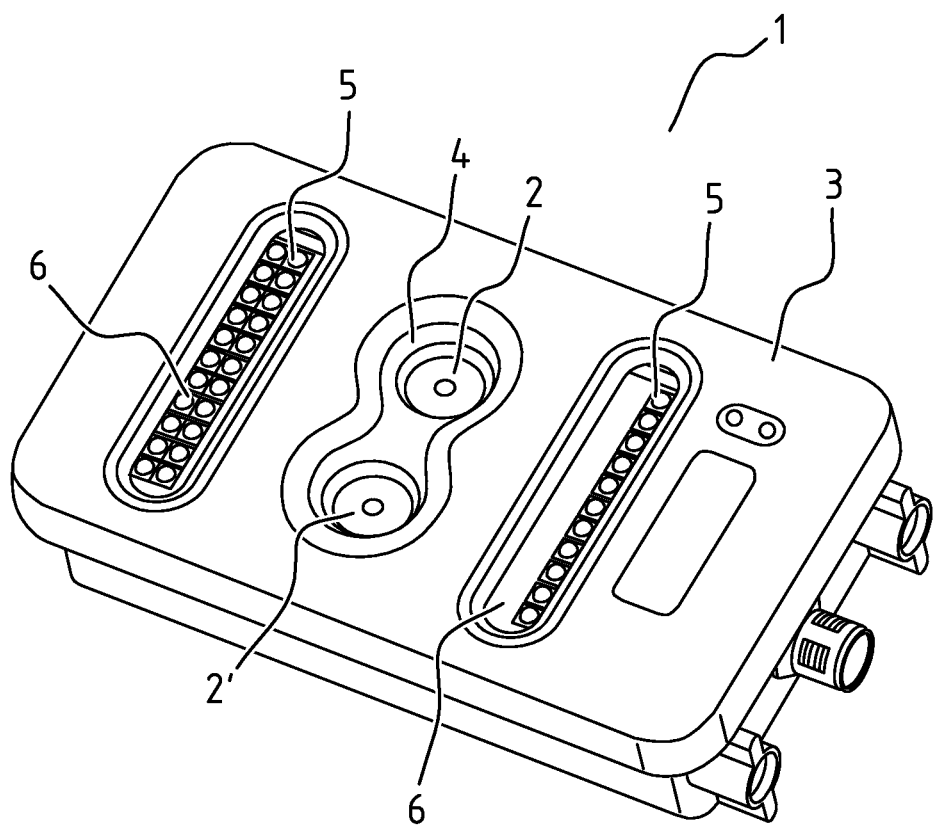
FIG. 1 shows an embodiment of a camera system according to the present invention.

Camera system 1 comprises several sensor units 2, 2' with CMOS or CCD matrix or line scan sensors and lenses, possibly mounted on the same printed circuit board (PCB). Housing 3 of camera system 1 is provided here with a sensor opening 4. The electronics are designed such that sensors with different properties can be mounted closely adjacent to each other. The electronics are also provided with a lighting source 5, for instance embodied in light-emitting diodes (LEDs). Housing 3 of camera system 1 is provided here with an illumination opening 6. It is possible for the lighting to be switchable in groups so as to enable the use of different kinds of illumination, such as white, red, green and/or blue LEDs. This creates the option that, during the wait time necessary for processing a recording of a sensor, another recording can be made by another sensor with different illumination.

Recordings can also be made simultaneously with a plurality of sensors. The recordings of the sensors which have been made simultaneously and wherein in any case parts of the recordings overlap each other are used for local focal distance.

Sensor units 2,2' are used to measure the colour register, the fan-out and cocking register, the colours and defects in the image in printed material and/or in the printing process.

In FIG. 1 camera system 1 comprises a single pair of sensor units 2,2' comprising a first sensor unit 2 and a second sensor unit 2'. As first sensor unit it is for instance possible to select a matrix CMOS sensor with a dynamic range of 12 bits and a resolution of 200 DPI. As second sensor unit it is for instance possible to select a matrix CMOS sensor with a dynamic range of 8 bits and a resolution of 1000 DPI. Every recording of this sensor is used to measure the colour register, the fan-out and cocking register, and errors in plates which have an effect on the register in the printed material. A 3D image can optionally be recorded with sensor units 2,2'. Housing 3 complies with the NEMA IP67 standard so that it cannot become fouled internally. It is important for housing 3 to be made such that the fewest possible light reflections occur which could cause disruptions in the image. Camera system 1 therefore comprises as much anti-reflective black material as possible on the side where sensor units 2,2' and lighting source 5 are located, and the open spaces in housing 3 around lighting source 5 and sensor units 2,2' are made as small as possible. The glass surfaces for lighting source 5 and sensor units 2,2' therefore also comprise an anti-reflective layer and are provided with polarization filters. Were these measures not taken, light reflections would occur which cause disruptions to the measurements, whereby measurement can become less accurate. The remaining disruptions in the image resulting from undesired light reflections then remain within limits so that they can be compensated with software.

Electrical connections 7 must be made such that camera system 1 continues to comply with the NEMA IP67 standard.

Figure 2:
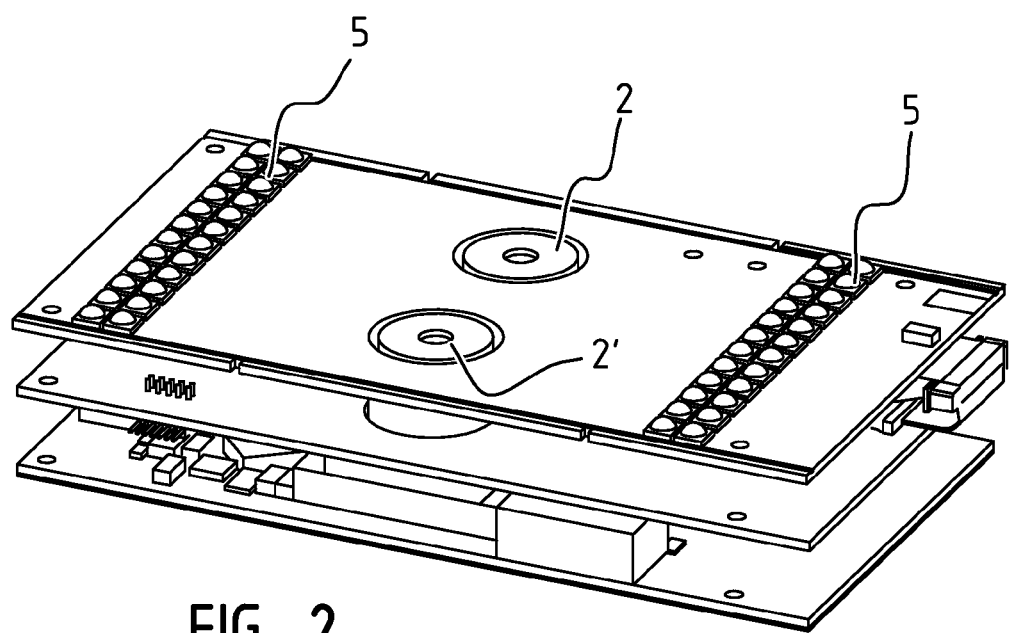
FIG. 2 shows the internal structure of the camera system of FIG. 1.

FIG. 2 shows three different PCBs which are mutually coupled. Together they create camera system 1. The reason that three PCBs are made instead of one PCB is that the total volume of camera system 1 thus remains limited and housing 3 of camera system 1 thus also remains small, so that the location of the camera in the printing process can be easily determined. The second reason is that future changes can thus be easily dealt with. The lower PCB comprises all electronic components associated with the sensor units. The middle PCB comprises all electronic components associated with the processing units for immediate processing of the images. The upper PCB comprises all electronic components associated with the lighting.

Because substantially improved and cheaper electronic components are often available within a few years, it is now thus easy to switch over since only one PCB with electronic components can be replaced by a PCB with new electronic components.

A second important reason for mounting the components on each other is that the electronics may not have a greater width than the image being read by the sensors. Such camera components can thus be coupled mutually adjacently to each other in simple manner and a bar sensor is created which has a plurality of fixed cameras over the width.

Figure 3:
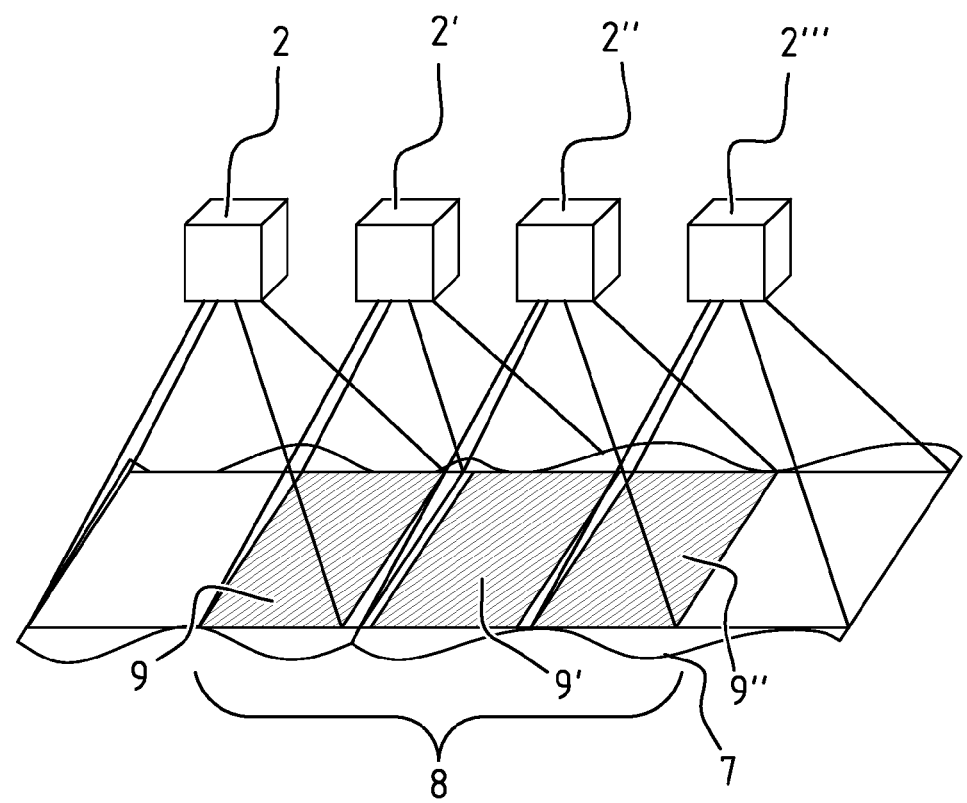
FIG. 3 is a schematic representation of a further embodiment of a camera system according to present invention.

FIG. 3 is a schematic representation of a further embodiment of a camera system according to the present invention. In this embodiment the distances between sensor units 2-2''' and the distance to paper web 7 are chosen such that printed image 8 can be wholly built up by means of overlap 9-9" between adjacent sensor units 2-2"". The focal distance can in this way be determined at several locations in printed image 8.

Figure 4A:
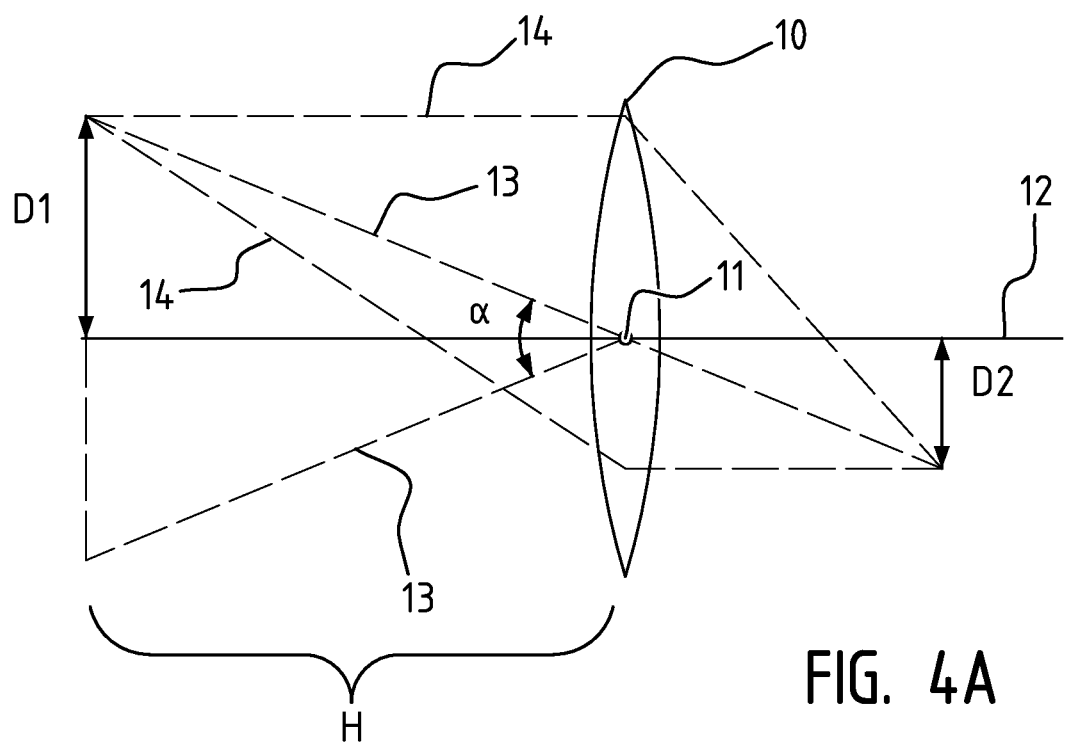
FIGS. 4A and 4B show how the focal distance can be determined according to the invention by means of overlap in recorded images.
Figure 4B:
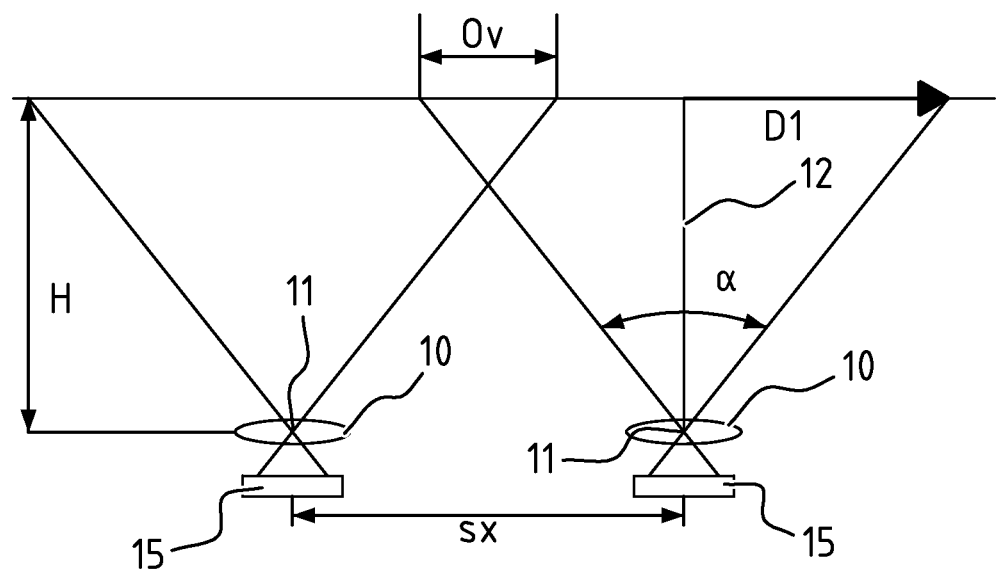

FIGS. 4A and 4B show how the focal distance can be determined according to the invention by means of overlap in recorded images.

FIG. 4A shows how a lens 10 with entrance pupil 11 and optical axis 12 shows an object with a height D1 on the sensor at the position D2. The angle of view α is indicated here by means of broken lines 13. Light beams incident on the sensor unit at an angle greater than angle of view α are substantially undetected by the sensor. In FIG. 4A D1 shows half the size of an image which can be seen by the sensor unit. Optical guide lines 14 are further shown for the purpose of determining D2.

The focal distance H calculated from entrance pupil 11 of lens 10 to the object with height D1 can be calculated in accordance with:

$$H = \frac{D1}{2\tan(0.5\alpha)}$$

FIG. 4B shows the situation wherein two sensors 15 are disposed adjacently of each other at a mutual distance Sx and wherein there is an overlap Ov between the images seen by sensors 15. The overlap Ov can be calculated in accordance with:

$$Ov=2D1-Sx$$

Combining the above equations results in:

$$Ov=4H \tan(0.5\alpha)-Sx$$

Focal distance H can be derived herefrom in simple manner. It can further be stated that a change in focal distance ΔH brings about a change in overlap ΔOv which can be calculated in accordance with:

$$\Delta Ov=4\Delta H \tan(0.5\alpha)$$

Figure 5:
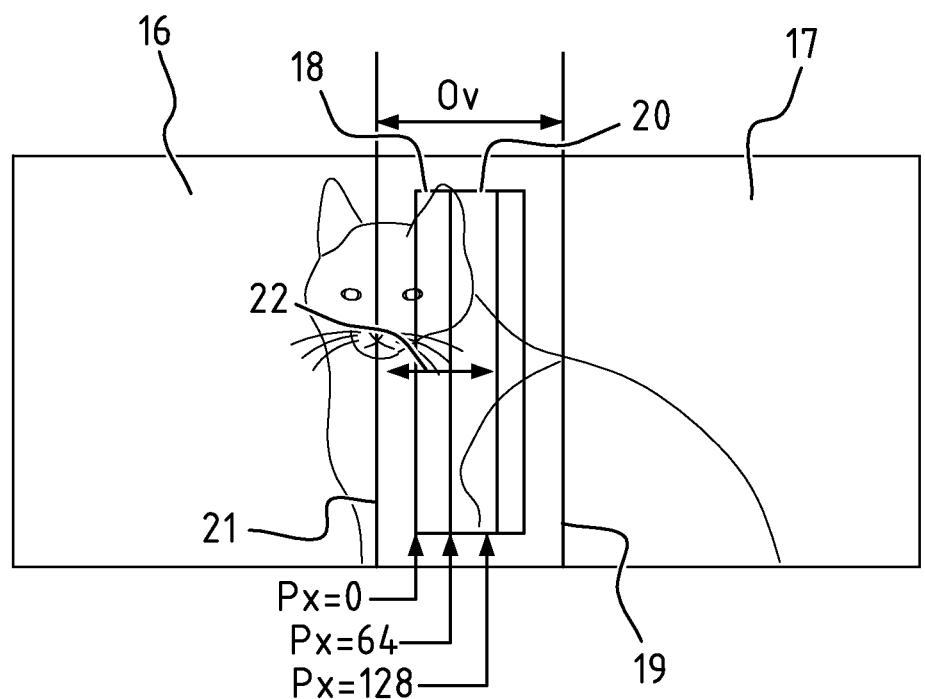
FIG. 5 shows an option for determining the overlap between images.

FIG. 5 shows an option for determining the overlap between images. The images are shown in the figure as seen by a first and second sensor unit.

In order to determine overlap Ov a band 18 is taken within the overlap associated with image 16 from the first sensor unit. Band 18 has a fixed width and position relative to an edge 19 of the image. Another band 20 is taken within the overlap associated with image 17 from the second sensor unit. Band 20, which in FIG. 5 falls within band 18, likewise has a fixed width which is half the width of band 18. The position of band 20 is used to determine the degree of overlap.

When focal distance H changes, the content of bands 18,20 will change due to shifting relative to each other. The position of band 20 relative to band 18 can be determined by means of convolution calculations. The overlap Ov can be determined when the position of both bands is known.

FIG. 5 shows how the position of the second band is determined. This takes place by means of maximizing the function Px:

$$Px = \max \sum_{m=0}^{m=s} \sum_{n=0}^{n=s} B_n R_{n+m}$$

wherein m and n are indexes for pixel positions in the transverse direction (arrow 22) and $B_n$ and $R_{n+m}$ are pixel values for images 16,17 and s the width in pixels of band 20.

In the above method bands in which corresponding information is shown are sought in the two images 16,17. Once this position has been found the images 16,17 can be laid over each other as shown in FIG. 5 in order to determine overlap Ov by means of edges 19,21 of respective images 16,17.

The invention is discussed in the foregoing inter alia with reference to embodiments thereof. It will be apparent to the skilled person that the invention is not limited thereto but that several other embodiments are possible without departing from the scope of protection as defined by the appended claims.

The invention claimed is:

1. A colour measuring system for measuring colour in a printed image printed by a printing press, comprising:
a camera system configured for recording a respective image of the printed image using a first and second optical sensor, the camera system comprising:
a pair of optical sensors, the pair comprising the first and second optical sensor, each configured to record the respective image of the printed image, wherein an angle of view of the first optical sensor overlaps an angle of view of the second optical sensor in an overlap area and the printed image is situated at least partially in said overlap area, and each of said first and second optical sensors has an entrance pupil placed at a predetermined distance from each other; and
a processor operatively coupled to said first and second optical sensors, wherein the processor is configured to determine a focal distance from at least one of the first and second optical sensors to the printed image using the predetermined distance, the angle of view of at least one of the first and second optical sensors, and an overlap of the respective images, wherein said focal distance is measured from the entrance pupil of at least one of the first and second optical sensors to the printed image; and
a colour corrector configured to:
perform a colour calibration of the first and/or second optical sensor at the determined focal distance; and
correct a light intensity detected by the calibrated first and/or second optical sensor.

2. The colour measuring system as claimed in claim 1, wherein each of said first and second optical sensors comprises a sensor and a lens for the purpose of focussing light on said sensor.

3. The colour measuring system as claimed in claim 2, wherein said sensor comprises a Charge-Coupled Device (CCD) chip.

4. The colour measuring system as claimed in claim 1, further comprising one lighting source disposed for both the first and second optical sensors for illuminating the printed image prior to recording of the respective image of the printed image.

5. The colour measuring system as claimed in claim 4, wherein a resolution and/or dynamic range of the first optical sensor differs from a resolution and/or dynamic range of the second optical sensor.

6. The colour measuring system as claimed in claim 4, further comprising at least one colour filter placed for at least one of the first and second optical sensors.

7. The colour measuring system as claimed in claim 1, comprising a housing in which at least the first and second optical sensors and the one lighting source are accommodated.

8. The colour measuring system as claimed in claim 7, wherein the housing is provided with at least one sensor opening for passage of light coming from the printed image in the direction of the first and/or second optical sensor and with at least one illumination opening for passage of light coming from the one lighting source in the direction of the printed image.

9. The colour measuring system as claimed in claim 1, wherein each of the first and second optical sensors has an optical axis, wherein said optical axes run substantially parallel and each optical axis intersects the relevant entrance pupil, wherein the focal distance is measured along at least one of the optical axes.

10. The colour measuring system as claimed in claim 1, wherein the processor is configured to determine the overlap between the respective images using convolution calculations of the respective images.

11. The colour measuring system as claimed in claim 1, comprising a plurality of said pairs of optical sensors, wherein the processor is operatively coupled to each optical sensor and is configured to determine for each pair a focal distance from at least one of the first and second optical sensors of this pair to the printed image using an overlap of the respective images, wherein the overlap in recorded images associated with a pair of optical sensors abuts or overlaps an overlap in recorded images associated with an adjacent pair of optical sensors.

12. A printing press comprising the colour measuring system according to claim 1.

13. The printing press as claimed in claim 12, further comprising:
- a memory for storing a digital print image, wherein the digital print image comprises a feature;
- an image scaler for scaling an image recorded by the first and/or second optical sensor of a printed image corresponding to the digital print image printed on a paper web by the printing press using the focal distance determined with the camera system and the digital print image;
- wherein a correlation is known between a size of the printed image and a size of the recorded image when recorded at a predefined focal distance;
- wherein the image scaler is configured to scale the recorded image in dependence of a difference between the determined focal distance and said predefined focal distance;
- the printing press further comprising a position determiner for determining a position of the feature in the scaled recorded image and for determining a position of the feature in the printed image relative to the edge of the web of paper based on the determined position of the feature in the scaled recorded image; and a position controller for controlling a position of the paper web subject to the determined position of the feature in the printed image.

\* \* \* \* \*